Patented July 18, 1939

2,166,868

UNITED STATES PATENT OFFICE 2,166,868

COLLOIDAL ALUMINUM HYDROXIDE

Harold W. Jones, Columbus, Ohio, assignor to The Columbus Pharmacal Company, Columbus, Ohio, a corporation of Ohio No Drawing. Application March 2, 1936, Serial No. 66,605

6 Claims. (Cl. 167—72)

An object of this invention is to provide a colloidal aluminum hydroxide which can be dried and pulverized and which, when put into water, will return to the hydrated or gel form.

Another object is to provide a process of making the same.

These and other objects, as will hereinafter appear, are accomplished by this invention, which consists broadly in treating aluminum hydroxide with a small amount of a protective organic colloid such as acacia, or gelatin.

The substance commonly known as aluminum hydroxide and generally given the formula $Al(OH)_3$, is ordinarily prepared by precipitation from a solution of a soluble salt of aluminum by the addition of ammonium hydroxide or a solution of sodium carbonate, or of other alkali carbonate. The freshly precipitated or gel form is highly adsorptive, and its therapeutic value as an antacid depends, not so much on its power to neutralize acidity by chemical means, as it is difficultly soluble in dilute acid, but upon its power to adsorb excess hydrochloric acid when introduced into the stomach, and also upon the fact that it is capable of forming a non-toxic protective coating over the stomach mucosa.

The gel thus formed is in an inorganic colloidal state to which it owes the above valuable properties. However, in the preparation of dried commercial aluminum hydroxide, the colloidal condition which existed when it was freshly prepared and still in a moist state is completely destroyed in the dehydrating process, and the ordinary dried product will not again return to the hydrated or colloidal state when mixed with water.

The purpose of this invention is to produce a partially dehydrated aluminum hydroxide, in powder form, which will return to the hydrated form when mixed with water, the result being accomplished by the addition of a protective colloid such as acacia, dextrin, tragacanth, gelatin, pectin, the starches, mucilage such as that made from quince seed, elm bark or Irish moss, or other soluble organic colloid to the solution of the aluminum salt before the precipitation takes place. When formed in this manner the colloidal particles of aluminum hydroxide are believed to be encased by a protective coating of the organic colloid. After drying, if the powder is again mixed with water, the protective coating redissolves and the colloidal suspension of aluminum hydroxide is recovered in a state similar to that in which it existed when freshly precipitated, the presence of a small percentage of hydrochloric acid such as in found in the stomach, assisting this result.

For example, 100 grams of ammonium alum, $AlNH_4(SO_4)_2+12H_2O$, is dissolved in 1000 cc. of water in which has previously been dissolved 0.875 gram of acacia; ammonia water is added to this solution until precipitation is complete. The precipitate is washed free from soluble salts with water, dried at a temperature of about 40° C., and when dry reduced to a fine powder. If this powder is shaken with water, containing about 0.3% of hydrochloric acid, it will return to its original gelatinous state, forming a gel, and 1 gram of the powder is capable of adsorbing 3 to 5 cc. of N/10 hydrochloric acid, whereas the compound produced in the usual way, without the use of a protective colloid, will not again become hydrated and is devoid of acid adsorption power.

I claim:

1. As a new composition of matter, a dry, pulverized antacid medicinal material consisting essentially of partially dehydrated aluminum hydroxide precipitated in the presence of a water-soluble protective organic colloid and having a relatively small amount of said colloid adhering thereto, said aluminum hydroxide being capable, when said dry material is mixed with water, of reverting to a gelatinous state similar to that of freshly precipitated aluminum hydroxide, and possessing marked acid-adsorbing power.

2. The invention defined in claim 1, wherein said water-soluble organic colloid is a gum.

3. The invention defined in claim 1, wherein said water-soluble organic colloid is starch.

4. The invention defined in claim 1, wherein said water-soluble organic colloid is gelatin.

5. The process of making a partially dehydrated aluminum hydroxide capable, upon being mixed with water, of assuming a gelatinous state similar to that of freshly precipitated aluminum hydroxide, which comprises precipitating aluminum hydroxide, by means of a suitable basic precipitant, from a water solution of an aluminum salt also containing a relatively small amount of a soluble organic protective colloid, separating the resultant gelatinous precipitate and drying it at a temperature sufficiently high to effect partial dehydration, and pulverizing the dried precipitate.

6. The process of making a partially dehydrated aluminum hydroxide capable, upon being mixed with water, of assuming a gelatinous state similar to that of freshly precipitated aluminum hydroxide, which comprises precipitating aluminum hydroxide, by means of a suitable basic precipitant, from a water solution of an aluminum salt also containing a relatively small amount of a soluble organic protective colloid, washing the resultant gelatinous precipitate substantially free from soluble salts, drying it at a temperature approximately 40° C., and pulverizing the dried precipitate.

HAROLD W. JONES.